US011843894B2

(12) United States Patent
Nakagawa

(10) Patent No.: US 11,843,894 B2
(45) Date of Patent: Dec. 12, 2023

(54) ELECTRONIC APPARATUS, METHOD OF CONTROLLING THE SAME, AND STORAGE MEDIUM

(71) Applicant: CANON KABUSHIKI KAISHA, Tokyo (JP)

(72) Inventor: Koichi Nakagawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/721,189

(22) Filed: Apr. 14, 2022

(65) Prior Publication Data
US 2022/0345642 A1 Oct. 27, 2022

(30) Foreign Application Priority Data

Apr. 26, 2021 (JP) ................. 2021-074490

(51) Int. Cl.
H04N 5/262 (2006.01)
H04N 13/398 (2018.01)
G03B 35/10 (2021.01)
H04N 13/207 (2018.01)
H04N 23/63 (2023.01)
H04N 23/698 (2023.01)
G03B 17/14 (2021.01)

(52) U.S. Cl.
CPC ........... *H04N 5/2628* (2013.01); *G03B 35/10* (2013.01); *H04N 13/207* (2018.05); *H04N 13/398* (2018.05); *H04N 23/632* (2023.01); *H04N 23/698* (2023.01); *G03B 17/14* (2013.01)

(58) Field of Classification Search
CPC .. H04N 5/2628; H04N 13/207; H04N 13/398; H04N 23/632; H04N 23/698; H04N 13/218; H04N 23/69; H04N 13/204; G03B 35/10; G03B 17/14
See application file for complete search history.

(56) References Cited

U.S. PATENT DOCUMENTS

2011/0122233 A1* 5/2011 Kasai ................. H04N 13/20
348/E13.074
2011/0126159 A1* 5/2011 Ko ....................... H04N 5/44504
715/848
2013/0038682 A1* 2/2013 Takami ............... H04N 13/327
348/42

(Continued)

FOREIGN PATENT DOCUMENTS

WO 2011121840 A1 10/2011

*Primary Examiner* — Michael Lee
(74) *Attorney, Agent, or Firm* — Canon U.S.A., Inc. IP Division

(57) ABSTRACT

An electronic apparatus includes a processor, and a memory storing a program which, when executed by the processor, causes the electronic apparatus to perform control to display an image in a display unit based on a third image including a first image captured through a first optical system, and a second image having a parallax with respect to the first image, captured through a second optical system, receive an enlargement instruction for enlarging a part of the image displayed in the display unit, and perform control, upon reception of the enlargement instruction while the third image is displayed, to display in the display unit an enlarged image including an enlarged portion of either one of the first image and the second image.

12 Claims, 7 Drawing Sheets

(56) References Cited

U.S. PATENT DOCUMENTS

| | | | |
|---|---|---|---|
| 2013/0169761 A1* | 7/2013 | Inoue | H04N 13/246 |
| | | | 348/49 |
| 2017/0064374 A1* | 3/2017 | Eim | G06F 3/0485 |
| 2018/0069983 A1* | 3/2018 | Cho | H04N 23/632 |
| 2019/0394394 A1* | 12/2019 | Asajima | H04N 23/80 |

* cited by examiner

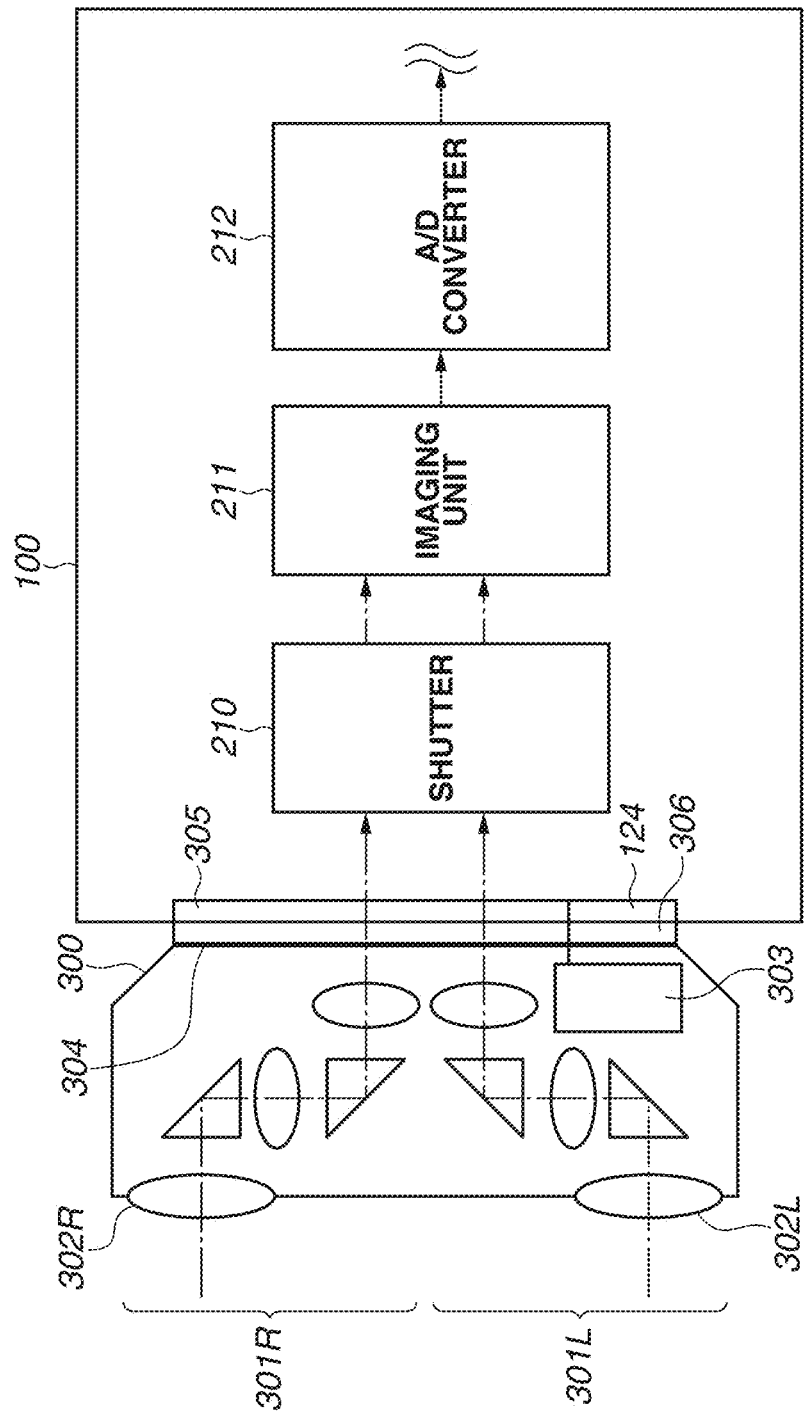

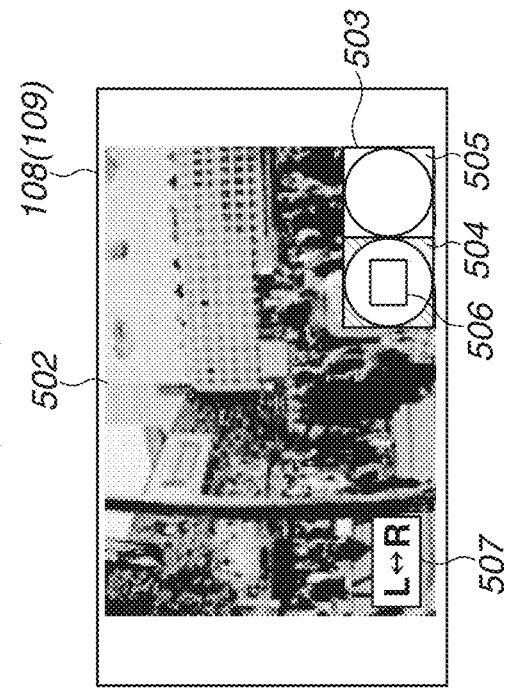
FIG.5A
FIG.5B
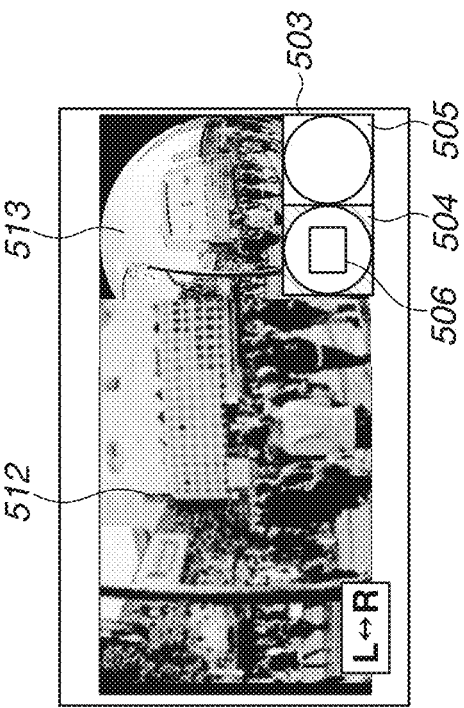
FIG.5C
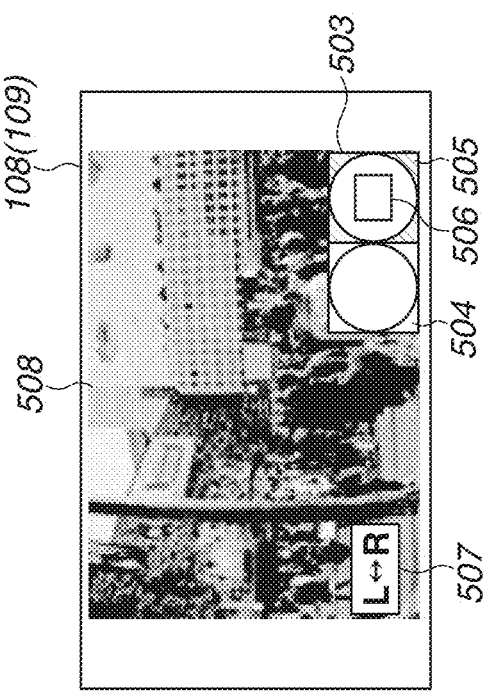
FIG.5D

ELECTRONIC APPARATUS, METHOD OF CONTROLLING THE SAME, AND STORAGE MEDIUM

BACKGROUND

Field of the Disclosure

The present disclosure relates to an electronic apparatus, a method of controlling the same, and a recording medium.

Description of the Related Art

There is known a technique of acquiring wide viewing angle images with a parallax through two different optical systems, and then mapping the images on a virtual sphere to display a Virtual Reality (VR) image with a stereoscopic effect. A dual lens VR camera for capturing images with a parallax includes two different optical systems oriented in the same direction to capture two different images with a parallax in a single image capturing. In a certain dual lens VR camera, each optical system captures images in a wide range of 180 degrees or more in the vertical and horizontal directions (i.e., a hemisphere, 90 degrees or more in all directions from the image center). Known VR image display methods include "monocular VR display" for displaying one image through deformation by mapping an VR image on the virtual sphere, and "dual side-by-side VR display" for displaying a right-eye VR image and a left-eye VR image side by side in the right and left regions, respectively.

WO 11/121840 discloses a stereoscopic imaging apparatus that captures an identical subject from the right and left view points using two different imaging units arranged side by side with a parallax, to acquire a right-eye image and a left-eye image, respectively.

SUMMARY

The present disclosure is directed to providing image display suitable for enlarging an image including a right-eye image and a left-eye image arranged side by side and checking details of the image.

According to an aspect of the present disclosure, an electronic apparatus includes a processor, and a memory storing a program which, when executed by the processor, causes the electronic apparatus to perform control to display an image in a display unit based on a third image including a first image captured through a first optical system, and a second image having a parallax with respect to the first image, captured through a second optical system, receive an enlargement instruction for enlarging a part of the image displayed in the display unit, and perform control, upon reception of the enlargement instruction while the third image is displayed, to display in the display unit an enlarged image including an enlarged portion of either one of the first image and the second image.

Further features of the present disclosure will become apparent from the following description of exemplary embodiments with reference to the attached drawings.

BRIEF DESCRIPTION OF THE DRAWINGS

FIG. 3 is a schematic view illustrating a configuration of a lens unit.

FIGS. 5A to 5D are schematic views illustrating live view images of dual side-by-side images.

DESCRIPTION OF THE EMBODIMENTS

Some exemplary embodiments of the present disclosure will be described below with reference to the accompanying drawings. The present exemplary embodiment will be described below centering on examples of a digital camera (imaging apparatus) as an electronic apparatus.

Figure 1A:
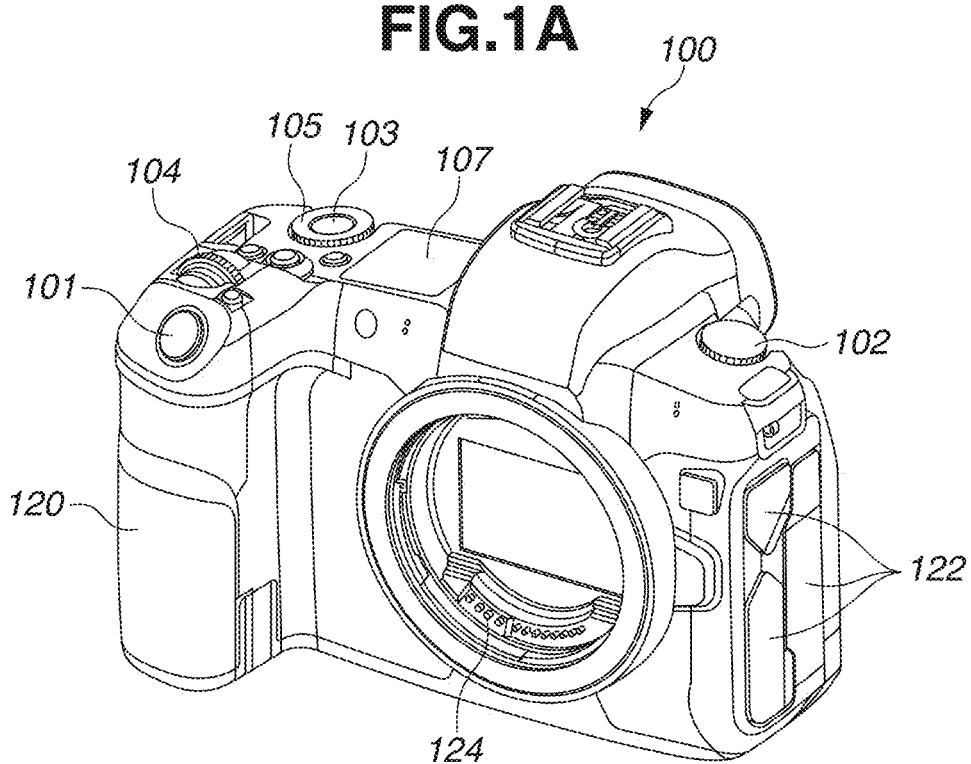
FIGS. 1A and 1B schematically illustrate an outer appearance of a camera.
Figure 1B:
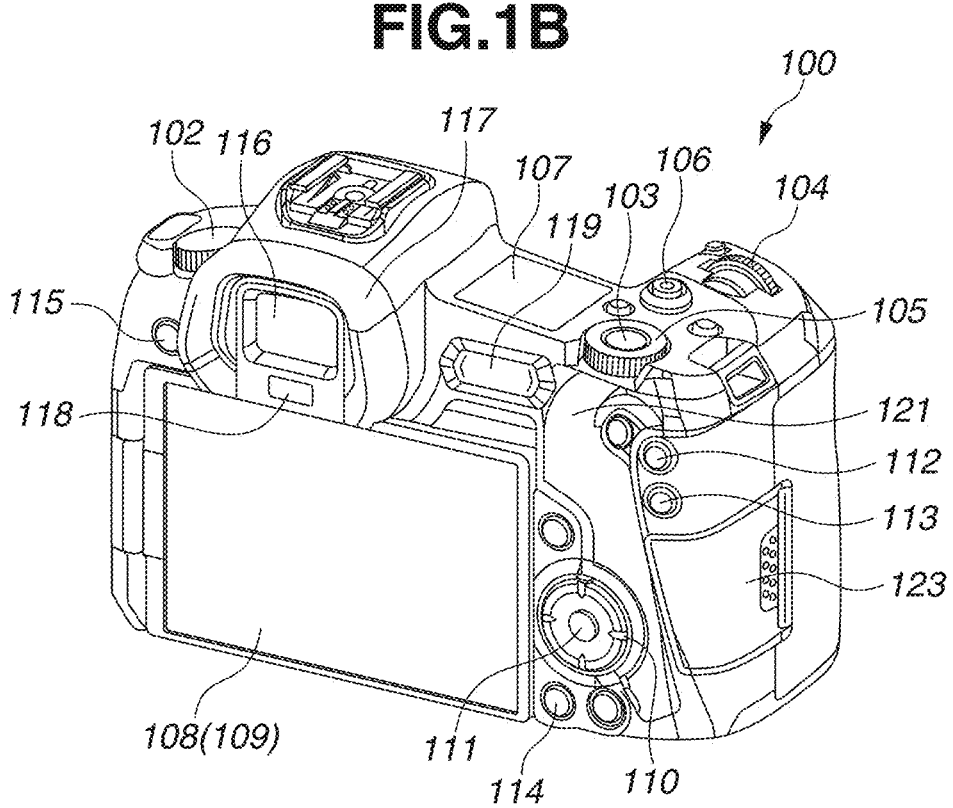

FIGS. 1A and 1B are illustrate examples of outer appearances of a digital camera 100 (hereinafter simply referred to as a camera). FIG. 1A is a perspective view illustrating the camera 100 in sight of the front face, and FIG. 1B is a perspective view illustrating the camera 100 in sight of the rear face. The camera 100 includes a shutter button 101, a power switch 102, a mode selection switch 103, a main electronic dial 104, a sub electronic dial 105, a moving image button 106, and an out-finder display unit 107 on the top face. The shutter button 101 is an operation member to perform an image capturing preparation or issue an image capturing instruction. The power switch 102 is an operation member to turn power of the camera 100 ON or OFF. The mode selection switch 103 is an operation member to select various modes. The main electronic dial 104 is a rotary operation member to change setting values of the shutter speed, diaphragm, and other properties. The sub electronic dial 105 is a rotary operation member to move a selection frame (cursor) and feeding images. The moving image button 106 is an operation member to issue instructions for starting and stopping moving image capturing (recording). The out-finder display unit 107 displays various setting values of the shutter speed, diaphragm, and other properties.

The camera 100 includes a display unit 108, a touch panel 109, a cross key 110, a SET button 111, an automatic exposure (AE) lock button 112, an enlargement button 113, a reproduction button 114, a menu button 115, an eyepiece portion 116, an eye contact detection unit 118, and a touch bar 119 on the rear face. The display unit 108 displays images and various pieces of information. The touch panel 109 is an operation member to detect touch operations on the display surface (touch operation surface) of the display unit 108. The cross key 110 is an operation member including up, down, right, and left keys (four-way key). The cross key 110 allows operation at its pressed position. The SET button 111 is an operation member to be pressed mainly to determine a selection item. The AE lock button 112 is an operation member to be pressed to fix an exposure state in the image capturing standby state. The enlargement button 113 is an operation member to turn the enlargement mode ON or OFF in the live view display (LV display) in the image capturing mode. With the enlargement mode ON, operating the main electronic dial 104 enlarges or reduces the live view image (LV image). The enlargement button 113 is used to enlarge reproduced images or increase magnification rate in the reproduction mode. The reproduction button 114 is an operation member to switch between the image capturing mode and the reproduction mode. Pressing the reproduction button 114 in the image capturing mode shifts the camera 100 to the reproduction mode, making it possible to display the latest one of the images recorded in a recording medium 227 (described below), in the display unit 108.

The menu button 115 is an operation member to be pressed to display a menu screen for making various settings in the display unit 108. The user is able to intuitively make various settings on the menu screen displayed in the display unit 108 with the cross key 110 and the SET button 111. The eyepiece portion 116 is provided with an eye contact finder (look-in finder) 117 to be brought to the user's eye. The eyepiece portion 116 allows the user to visually recognize an image displayed in an internal Electronic View Finder (EVF) 217 (described below). The eye contact detection unit 118 is a sensor to detect whether the user's eye is close to the eyepiece portion 116.

The touch bar 119 is a line-shaped touch operation member (line touch sensor) to accept touch operations. The touch bar 119 is disposed at a (touchable) position where touch operations can be performed with the thumb of the right hand while holding the grip portion 120 with the right hand (the little finger, the third finger, and the middle finger of the right hand) so that the shutter button 101 can be pressed with the forefinger of the right hand.

More specifically, the touch bar 119 can be operated with the user's eye close to the eyepiece portion 116 to look in the eye contact finder 117 in a state in which the user is poised to press the shutter button 101 at any time (photographing attitude). The touch bar 119 accepts tap operations (touching the touch bar 119 and then detaching the finger without moving it within a predetermined time period) and right/left slide operations (touching the touch bar 119 and then move the touch position while in contact with the touch bar 119). The touch bar 119 is an operation member different from the touch panel 109 and is not provided with a display function. The touch bar 119 according to the present exemplary embodiment is a multifunction bar, and functions, for example, as an M-Fn bar.

The camera 100 also includes the grip portion 120, a thumb rest portion 121, terminal covers 122, a lid 123, and a communication terminal 124. The grip portion 120 has a shape that is easy to grip with the right hand when the user holds the camera 100. The shutter button 101 and the main electronic dial 104 are disposed at positions where these operation members can be operated by the forefinger of the right hand while holding the camera 100 by gripping the grip portion 120 with the little finger, the third finger, and the middle finger of the right hand. The sub electronic dial 105 and the touch bar 119 are disposed at positions where these operation members can be operated by the thumb of the right hand in a similar state. The thumb rest portion 121 (thumb standby position) is a grip portion provided at a position on the rear face of the camera 100, where the thumb of the right hand holding the grip portion 120 is easy to rest in a state where no operation member is operated. The thumb rest portion 121 is made of a rubber material to improve the holding force (grip feeling). The terminal covers 122 protect connectors such as connection cables for connecting the camera 100 with external apparatuses. The lid 123 closes the slot for storing the recording medium 227 (described below) to protect the recording medium 227 and the slot. The communication terminal 124 enables the camera 100 to communicate with a lens unit 200 (described below), which is attachable to and detachable from the camera 100.

Figure 2:
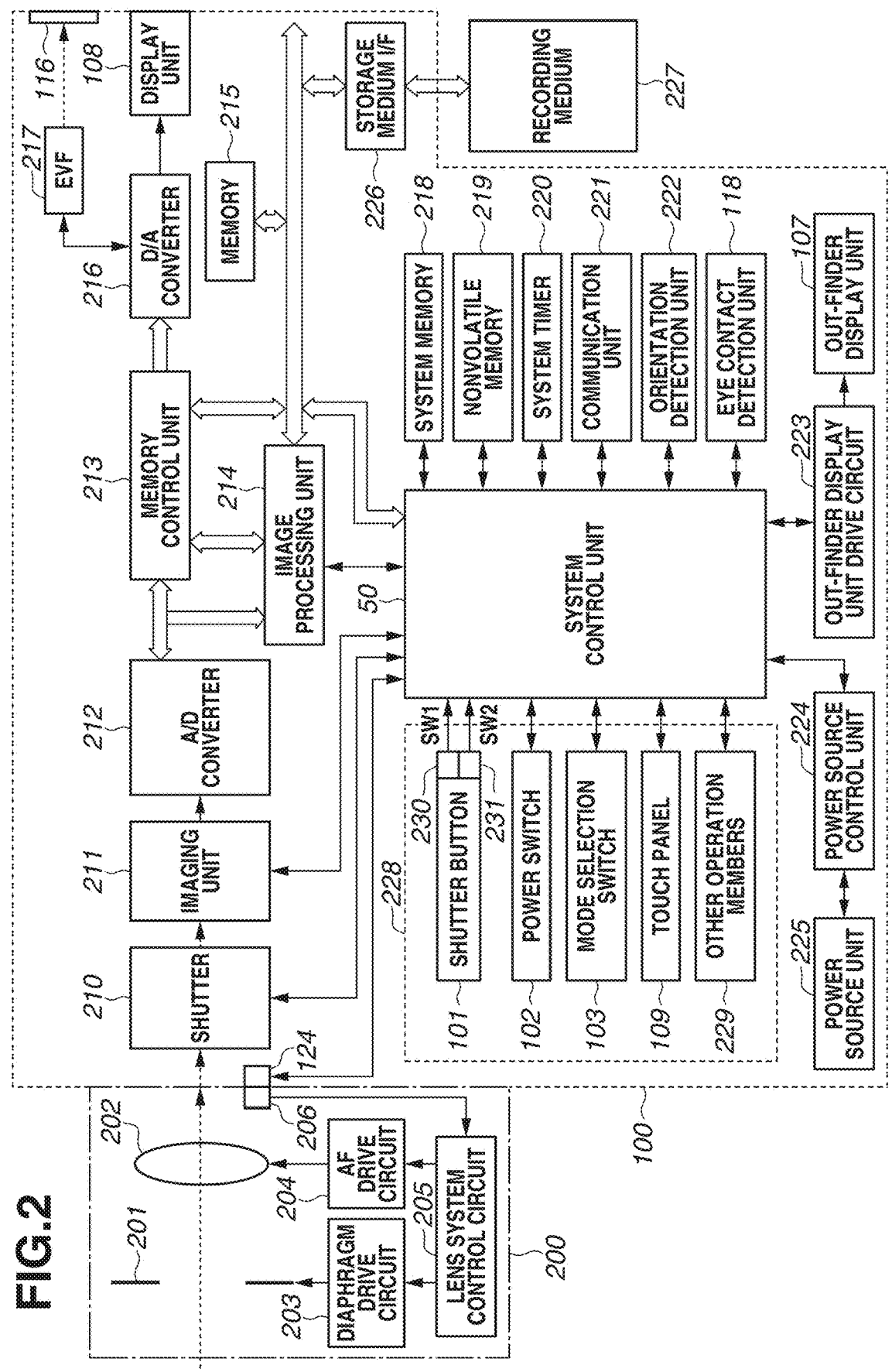
FIG. 2 is a schematic view illustrating an internal configuration of the camera.

FIG. 2 illustrates an internal configuration example of the camera 100. Referring to FIGS. 1A and 1B, like numbers refer to like components in FIG. 2, and redundant descriptions thereof will be omitted as appropriate. The lens unit 200 or a lens unit 300 (described below) is attached to the camera 100. Firstly, a camera system including the camera 100 and, as an example, the lens unit 200 as a conventional single-lens unit will be described.

The lens unit 200 is a type of interchangeable lens attachable to and detachable from the camera 100. The lens unit 200 as a single-lens unit is an example of a regular lens. Unlike the lens unit 300 (described below), the lens unit 200 includes a single optical system.

The lens unit 200 includes a diaphragm 201, a lens 202, a diaphragm drive circuit 203, an automatic focus (AF) drive circuit 204, a lens system control circuit 205, and a communication terminal 206. The diaphragm 201 has an adjustable aperture diameter. The lens 202 includes a plurality of lenses. The diaphragm drive circuit 203 controls the aperture diameter of the diaphragm 201 to adjust the quantity of light. The AF drive circuit 204 drives the lens 202 to adjust the focus. The lens system control circuit 205 controls the diaphragm drive circuit 203 and the AF drive circuit 204 based on instructions from a system control unit 50 (described below). The lens system control circuit 205 controls the diaphragm 201 via the diaphragm drive circuit 203 to shift the position of the lens 202 via the AF drive circuit 204 to adjust the focus. The lens system control circuit 205 communicates with the camera 100. More specifically, the lens system control circuit 205 communicates with the camera 100 via the communication terminal 206 of the lens unit 200 and the communication terminal 124 of the camera 100. The communication terminal 206 is used by the lens unit 200 to communicate with the camera 100.

The camera 100 will be described. The camera 100 includes a shutter 210, an imaging unit 211, an analog-to-digital (A/D) converter 212, a memory controller 213, an image processing unit 214, a memory 215, a digital-to-analog (D/A) converter 216, the EVF 217, the display unit 108, and the system control unit 50.

The shutter 210 is a focal-plane shutter to control the exposure time of the imaging unit 211 based on instructions from the system control unit 50. The imaging unit 211 is an image sensor that is a Charge Coupled Device (CCD) sensor or a complementary Metal Oxide Semiconductor (CMOS) sensor to convert an optical image into an electrical signal. The imaging unit 211 may include an imaging plane phase-difference sensor to output defocus amount information to the system control unit 50. The A/D converter 212 converts the analog signal output from the imaging unit 211 into a digital signal.

The image processing unit 214 performs predetermined processing (pixel interpolation, resize processing including reduction, and color conversion processing) on data from the A/D converter 212 or from the memory controller 213.

The image processing unit 214 also performs predetermined calculation processing on captured image data. The system control unit 50 performs exposure control and distance measurement control based on obtained calculation results. This processing enables AF processing, Automatic Exposure (AE) processing, and Electronic Flash Preliminary Emission (EF) processing based on the Through-The-Lens (TTL) method. The image processing unit 214 also performs predetermined calculation processing on the captured image data and performs TTL-based Automatic White Balance (AWB) processing based on obtained calculation results.

Image data from the A/D converter 212 is stored in the memory 215 via the image processing unit 214 and the memory controller 213. Otherwise, image data from the A/D converter 212 is stored in the memory 215 via the memory controller 213 without being processed by the image processing unit 214. The memory 215 stores image data captured by the imaging unit 211 and then converted into digital data by the A/D converter 212, and stores image data to be displayed in the display unit 108 and the EVF 2179. The memory 215 has a sufficient storage capacity to store a predetermined number of still images, and moving images and sound for a predetermined time period. The memory 215 also serves as an image display memory (video memory).

The D/A converter 216 converts image display data stored in the memory 215 into an analog signal and then supplies the signal to the display unit 108 and the EVF 217. Thus, the image display data stored in the memory 215 is displayed in the display unit 108 and EVF 217 via the D/A converter 216. The display unit 108 and the EVF 217 display data corresponding to the analog signal from the D/A converter 216. The display unit 108 and the EVF 217 are, for example, a Liquid crystal Display (LCD) and an organic electroluminescence (EL) display. The digital signal, generated in the A/D conversion by the A/D converter 212 and stored in the memory 215, is then converted into an analog signal by the D/A converter 216. The analog signal is successively transferred to the display unit 108 or the EVF 217 and displayed thereon, thus enabling the LV display.

The system control unit 50 includes at least one processor and/or at least one circuit. More specifically, the system control unit 50 may be a processor, a circuit, or a combination of both. The system control unit 50 generally controls the camera 100. The system control unit 50 runs programs recorded in a nonvolatile memory 219 to carry out each piece of processing of flowcharts (described below). The system control unit 50 also controls the memory 215, the D/A converter 216, the display unit 108, and the EVF 217 to perform display control. The system control unit 50 also functions as a reception unit to receive instructions input through operations on the above-described various operation members. The system control unit 50 performs controls corresponding received instructions.

The camera 100 includes a system memory 218, the nonvolatile memory 219, a system timer 220, a communication unit 221, an orientation detection unit 222, and an eye contact detection unit 118. The system memory 218 is, for example, a random access memory (RAM). Constants and variables used for operations of the system control unit 50 and programs read from the nonvolatile memory 219 are loaded into the system memory 218. The nonvolatile memory 219 is an electrically erasable recordable memory such as an electrically erasable programmable read only memory (EEPROM). Constants and programs used for operations of the system control unit 50 are recorded in the nonvolatile memory 219. The above-described programs refer to programs for carrying out the processing in flowcharts (described below). The system timer 220 is a time measurement unit to measure time used in various control and time of the built-in clock.

The communication unit 221 transmits and receives video and audio signals to/from an external apparatus wirelessly connected or connected with a wire cable thereto. The communication unit 221 is connectable with a wireless Local Area Network (LAN) and the Internet. The communication unit 221 is also communicable with an external apparatus through Bluetooth® and Bluetooth Low Energy. The communication unit 221 can transmit images (including the live image) captured by the imaging unit 211 and images recorded in the recording medium 227, and receive image data and other various information from an external apparatus.

The orientation detection unit 222 detects the orientation of the camera 100 with respect to the gravity direction. Based on the orientation detected by the orientation detection unit 222, the system control unit 50 determines whether the image captured by the imaging unit 211 is an image captured with the camera 100 horizontally held or an image captured with the camera 100 vertically held. The system control unit 50 can add direction information corresponding to the orientation detected by the orientation detection unit 222 to the image file of the image captured by the imaging unit 211, or rotate the image before recording. An acceleration sensor or gyroscope sensor can be used as the orientation detection unit 222. Motions of the camera 100 (pan, tilt, raising, and stand still) can also be detected by using the orientation detection unit 222.

The eye contact detection unit 118 can detect the approach of some object to the eyepiece portion 116 of the eye contact finder 117 incorporating the EVF 217. An infrared proximity sensor can be used as the eye contact detection unit 118. When an object comes closer, the infrared light projected from the light projecting portion of the eye contact detection unit 118 is reflected by the object and then received by the light receiving portion of the infrared light proximity sensor. The distance between the eyepiece portion 116 and the object can be determined based on the quantity of the received infrared light. In this way, the eye contact detection unit 118 performs eye contact detection to detect the proximity distance of the object to the eyepiece portion 116.

The eye contact detection unit 118 is an eye contact detection sensor to detect the approach (eye-on state) and the separation (eye-off state) of the eye (object) to and from the eyepiece portion 116 of the eye contact finder 117. When an object coming closer to the eyepiece portion 116 is detected at a predetermined distance or shorter in the eye-off state (non-approaching state), the eye contact detection unit 118 detects the eye-on state. When an object in the eye-on state (approaching state) is detached and separated from the eyepiece portion 116 by a predetermined distance or longer, the eye contact detection unit 57 detects the eye-oft state. The threshold value for detecting the eye-on state and the threshold value for detecting the eye-off state may be different, for example, when a hysteresis is provided. Once the eye-on state is detected, the eye-on state continues until the eye-off state is detected. Once the eye-off state is detected, the eye-off state continues until the eye-on state is detected. The system control unit 50 turns display of the display unit 108 and the EVF 217 ON (display state) or OFF (undisplay state) depending on the state detected by the eye contact detection unit 118. More specifically, at least when the camera 100 is in the image capturing standby state and when an automatic changeover is set for the display destination of the live view image, the following display control is performed. In the eye-off state, the display unit 108 is set as the display destination, i.e., the display of the display unit 108 is turned ON and the display of the EVF 217 is turned OFF. In the eye-on state, on the other hand, the EVF 217 is set as the display destination, i.e., the display of the EVF 217 is turned ON and the display of the display unit 108 is turned OFF. The eye contact detection unit 118 is not limited to an infrared proximity sensor but may be another sensor as long as the sensor is capable of detecting the eye-on state.

The camera 100 also includes the out-finder display unit 107, an out-finder display drive circuit 223, a power source control unit 224, a power source unit 225, a recording medium interface (I/F) 226, and an operation unit 228.

The out-finder display unit 107 displays various setting values to the camera 100, such as the shutter speed and diaphragm, via the out-finder display drive circuit 223.

The power source control unit 224 includes a battery detection circuit, a direct-current to direct-current (DC-DC) converter, and a switch circuit to select a block to be supplied with power. The power source control unit 224 detects the attachment or detachment of a battery, the battery type, and the remaining battery capacity. The power source control unit 224 also controls the DC-DC converter based on detection results and instructions from the system control unit 50 to supply appropriate voltages to the recording medium 227 and other components for appropriate time periods.

The power source unit 225 includes a primary battery (such as an alkaline battery and a lithium battery), a secondary battery (such as a NiCd battery, a NiMH battery, and a Li battery), and an alternating current (AC) adapter. The recording medium I/F 226 is an interface to the recording medium 227 such as a memory card and a hard disk. The recording medium 227 is, for example, a memory card to record captured images, and includes a semiconductor memory and a magnetic disk. The recording medium 227 may be attachable to and detachable from or built in the camera 100.

The operation unit 228 is an input unit to accept operations from the user (user operations) and is used to input various instructions to the system control unit 50. The operation unit 228 includes the shutter button 101, the power switch 102, the mode selection switch 103, the touch panel 109, and other operation members 229. Other operation members 229 include the main electronic dial 104, the sub electronic dial 105, the moving image button 106, the cross key 110, the SET button 111, the AE lock button 112, the enlargement button 113, the reproduction button 114, the menu button 115, and the touch bar 119.

The shutter button 101 includes a first shutter switch 230 and a second shutter switch 231. The first shutter switch 230 turns ON in the middle of the operation on the shutter button 101, what is called a half depression (image capturing preparation instruction), to generate a first shutter switch signal SW 1. In response to the first shutter switch signal SW 1, the system control unit 50 starts image capturing preparation processing such as the AF processing, AE processing, AWB processing, and EF processing. The second shutter switch 231 turns ON upon completion of the operation on the shutter button 101, what is called a full depression (image capturing instruction), to generate a second shutter switch signal SW 2. In response to the second shutter switch signal SW 2, the system control unit 50 starts a series of image capturing processing including reading the signal from the imaging unit 211, generating an image file containing a captured image, and storing the image file in the recording medium 227.

The mode selection switch 103 changes the operation mode of the system control unit 50 to either the still image capturing mode, the moving image capturing mode, or the reproduction mode. The still image capturing mode includes the automatic image capturing mode, automatic scene determination mode, manual mode, diaphragm priority mode (Av mode), shutter speed priority mode (Tv mode), and program AE mode (P mode). The still image capturing mode also includes various scene modes providing imaging settings for various captured scenes, and includes a custom mode. The mode selection switch 103 enables the user to directly select any one of these image capturing modes. Otherwise, the mode selection switch 103 enables the user to once select an image capturing mode list screen and then select any one of a plurality of displayed modes using the operation unit 228. Likewise, the moving image capturing mode may also include a plurality of modes.

The touch panel 109 is a touch sensor to detect various touch operations on the display surface of display unit 108 (operation surface of the touch panel 109). The touch panel 109 and the display unit 108 can be integrally formed. For example, the touch panel 109 is attached to the upper layer of the display surface of the display unit 108 so that the transmissivity of light does not disturb the display of the display unit 108. Then, the input coordinates on the touch panel 109 are associated with the display coordinates on the display surface of the display unit 108. This provides a graphical user interface (GUI) that virtually allows the user to directly operate the screen displayed in the display unit 108. The touch panel 109 may be one among various types including the resistance film type, capacitance type, surface elastic wave type, infrared type, electromagnetic induction type, image recognition type, and optical sensor type.

A touch is detected when a finger or pen comes into contact with the touch panel 109 or when a finger or pen comes close to the touch panel 109 depending on the type, and either type is applicable.

The system control unit 50 can detect the following operations on and states of the touch panel 109: * An operation to start touching the touch panel 109 with a finger or pen that had been out of contact with the touch panel 109 (hereinafter referred to as a "touch-down"). * A state where the finger or pen is in contact with the touch panel 109 (hereinafter referred to as a "touch-on"). * An operation to move the finger or pen while in contact with the touch panel 109 (hereinafter referred to as a "touch-move"). * An operation to detach (release) the finger or pen that had been in contact with the touch panel 109 from the touch panel 109 to end touching (hereinafter referred to as a "touch-up"). * A state where the finger or pen is out of contact with the touch panel 109 (hereinafter referred to as a "touch-off").

When a touch-down is detected, a touch-on is also detected at the same time. After detecting a touch-down, a touch-on is normally kept being detected until a touch-up is detected. In a state where a touch-move is detected, a touch-on is also detected at the same time. Even when a touch-on is detected, a touch-move is not detected if the touch position is not moving. After a touch-up of all of the fingers or the pen that had been in contact with the touch panel 109 is detected, a touch-off is detected.

The above-described operations and states as well as the position coordinates of the position where the finger or pen contacts the touch panel 109 are notified to the system control unit 50 via an internal bus. Based on the notified information, the system control unit 50 determines what kind of operation (touch operation) has been performed on the touch panel 109. For a touch-move, the moving direction of the finger or pen moving on the touch panel 109 can be determined for the individual vertical and horizontal components on the touch panel 109 based on changes in the position coordinates. If a touch-move over a predetermined distance or longer is detected, the system control unit 50 determines that a slide operation has been performed. An operation of quickly moving a finger over a certain distance while in contact with the touch panel 109 and then release the finger therefrom is referred to as a flick. In other words, a flick is an operation of flicking on the surface of the touch panel 109 with a finger. If a touch-move at a predetermined speed or higher over a predetermined distance or longer is detected and then a touch-up is subsequently detected, a flick is determined to have been performed (a flick is determined to have been performed following a slide). A touch operation of simultaneously touching a plurality of positions, for example, two positions (multi-touch) and bringing these positions close to each other is referred to as a "pinch-in". A touch operation of moving these positions away from each other is referred to as a "pinch-out". A pinch-out and a pinch-in are collectively referred to as a pinch operation (or simply referred to as a "pinch").

FIG. 3 is a schematic view illustrating an example configuration of the lens unit 300. FIG. 3 illustrates the camera 100 with the lens unit 300 attached thereto. Referring to the camera 100 illustrated in FIG. 3, like numbers refer to like components illustrated in FIG. 2, and redundant descriptions thereof will be omitted.

The lens unit 300 is a type of interchangeable lens attachable to and detachable from the camera 100. The lens unit 300 is a dual-lens unit to acquire an optical image in which the right and left images have a parallax. The lens unit 300 includes two different optical systems. Each optical system having a wide viewing angle of approximately 180 degrees acquires an optical image in the range of the front hemisphere. More specifically, each of the two optical systems of the lens unit 300 acquires images of subjects in viewing angles (field angle) of 180 degrees in the horizontal direction (horizontal angle, azimuth angle, and angle of yaw) and 180 degrees in the vertical direction (vertical angle, elevation angle, and angle of pitch). The lens unit 300 includes a right-eye optical system 301R including a plurality of lenses and reflection mirrors, a left-eye optical system 301L including a plurality of lenses and reflection mirrors, and a lens system control circuit 303. The right-eye optical system 301R corresponds to an example of a first optical system, and the left-eye optical system 301L corresponds to an example of a second optical system. The right-eye optical system 301R and the left-eye optical system 301L include lenses 302R and 302L, respectively, disposed nearer a subject than the camera 100 and oriented in the same direction. The optical axes of the lenses 302R and 302L are approximately in parallel. Each optical system includes what is called a fisheye lens, and a circular optical image is formed on the imaging unit 211 (sensor).

The lens unit 300 according to the present exemplary embodiment is a Virtual Reality (VR) 180 lens unit to capture images for what is called VR180, a VR image format that enables stereoscopic vision. The VR180 lens unit includes a fisheye lens in which both the right-eye optical system 301R and the left-eye optical system 301L capture images in a range of approximately 180 degrees. While the right-eye optical system 301R and the left-eye optical system 301L in the VR180 lens unit acquire an image that enables dual side-by-side VR image display in VR180 according to the present exemplary embodiment, the VR180 lens unit may be capable of capturing a wide viewing angle range of about 160 degrees smaller than the range of 180 degrees. The VR180 lens unit enables forming a right image (first image) formed through the right-eye optical system 301R and a left image (second image) formed through the left-eye optical system 301L with a parallax to the right image, on one or two different image sensors of the camera to which the VR180 lens unit is attached.

The lens unit 300 is attached to the camera 100 with a lens mount unit 304 of the lens unit 300 connected with a camera mount unit 305 of the camera 100. With the lens unit 300 attached to the camera 100, the system control unit 50 of the camera 100 and the lens system control circuit 303 of the lens unit 300 are electrically connected with each other via the communication terminals 124 and 306.

According to the present exemplary embodiment, the right image formed through the right-eye optical system 301R and the left image formed through the left-eye optical system 301L with a parallax to the right image are formed side by side on the imaging unit 211 of the camera 100. More specifically, the two optical images formed by the right-eye optical system 301R and the left-eye optical system 301L are formed on one image sensor. The imaging unit 211 converts the formed subject image (optical signal) into an analog electrical signal. The use of the lens unit 300 enables acquiring one piece of image data in which two different images (right and left images) with a parallax acquired through two different optical systems (the right-eye optical system 301R and the left-eye optical system 301L) are arranged side by side. The image acquired in this way is referred to as a dual side-by-side image (dual side-by-side image data). The dual side-by-side image is a pair of the right-side image corresponding to the right image and the left-side image corresponding to the left image arranged side by side. The right-side image is also referred to as a tight-eye image, and the left-side image is also referred to as a left-eye image.

FIG. 5A is a schematic view illustrating a display example of the dual side-by-side image data captured through the lens unit 300 being displayed in live view. A live view image (dual side-by-side image) 500 includes a live view image (right-side image) 501R corresponding to the right image captured through the right-eye optical system 301R, and live view image (left-side image) 501L corresponding to the left image captured through the left-eye optical system 301L. The live view images 501R and 501L, each are circularly shaped, and the degree of distortion (compression) increases closer to the outer edge of the circle. According to the present exemplary embodiment, the right-side image corresponding to the right image is arranged in the right-hand side region in the dual side-by-side image, and the left-side image corresponding to the left image is arranged in the left-hand side region in the dual side-by-side image. In the dual side-by-side image, the right-side image corresponding to the right image may be arranged on the left-hand side, and the left-side image corresponding to the left image may be arranged on the right-hand side.

The VR display using the right-eye image (right image) and the left-eye image (left image) in the acquired image allows the user to view a stereoscopic VR image in the range of about 180 degrees, what is called VR180.

A VR image refers to an image in VR display (described below). VR images include an omnidirectional image (entire celestial sphere image) captured by an omnidirectional camera (entire celestial sphere camera), and a panoramic image with a video range (effective video range) wider than the display range that can be displayed at one time in the display unit 108. VR images also include still images, moving images, and live images (image acquired from the camera almost in real time). A VR image has a video range (effective video range) in viewing angles of up to 360 degrees in the horizontal direction and up to 360 degrees in the vertical direction. VR images also include an image with a field angle wider than the field angle that can be captured by an ordinary camera even in viewing angles of less than 360 degrees in the horizontal direction and less than 360 degrees in the vertical direction, or with a video range wider than the display range that can be displayed at one time in the display unit 108. An image captured by the camera 100 by using the lens unit 300 (described above) is a type of a VR image. VR images can be displayed, for example, by setting the display mode of the display apparatus (capable of displaying a VR image) to the "VR view". When the user displays an VR image with a field angle of 360 degrees in the VR display and changes the orientation of the display apparatus in the horizontal direction (horizontal rotational direction), the user can view a horizontally seamless omnidirectional image.

The VR display (VR view) refers to a display method (display mode) that enables changing the display range. This display method displays an image in the visual field range corresponding to the orientation of the display apparatus out of the VR image. The VR display includes "monocular VR display" (monocular VR view) that performs deformation by mapping a VR image to a virtual sphere (deformation subjected to distortion correction) to display one image. The VR display also includes "dual side-by-side VR display" (dual side-by-side VR view) that performs deformation by mapping both a right-eye VR image and a left-eye VR image on the virtual sphere to display two images in the right- and left-hand side regions, respectively. Performing "dual side-by-side VR display" with the right-eye VR image and the left-eye VR image with a parallax allows stereoscopic vision. In either VR display, for example, with the user wearing a display apparatus such as a Head Mount Display (HMD), an image in the visual field range corresponding to the orientation of the user's face is displayed. For example, assume that, at a certain timing, a VR image displays an image in the visual field range centering on 0 degrees in the horizontal direction (specific direction, e.g., north) and 90 degrees in the vertical direction (90 degrees from the zenith, i.e., horizontal direction). If the orientation of the display apparatus is reversed (for example, the orientation of the display surface is changed from the south to the north) in this state, the display range is changed to an image in the visual field range centering on 180 degrees in the horizontal direction (opposite direction, e.g., the south) and 90 degrees in the vertical direction, out of the same VR image. More specifically, when the user wearing an HMD moves the face from the north to the south (i.e., the user turns to the back), the image displayed on the HMD is also changed from the north image to the south image. A VR image captured with the lens unit 300 according to the present exemplary embodiment is a VR180 image as a result of capturing the image in the range of about 180 degrees in the anterior direction and does not include the image in the range of about 180 degrees in the posterior direction. When such a VR180 image is displayed and the orientation of the display apparatus is changed to the side where no image exists, a blank region is displayed.

Displaying a VR image in the VR display in this way enables the user to feel as if he or she were visually in the VR image (in the VR space). The method of displaying VR images is not limited to the method of changing the orientation of the display apparatus. For example, the display range may be moved (scrolled) according to a user operation through the touch panel 109 or a direction button. In the VR display (in the "VR view" display mode), the display range may be changed according to the orientation change and in response to a touch-move on the touch panel 109, a drag operation with the mouse, or the depression of the direction button. A smart phone attached to VR goggles (head mount adapter) is a type of an HMD.

In the camera 100 with the above-described configuration, an image captured through the lens unit 300 includes images captured through the right-eye and the left-eye optical systems and arranged side by side. The user may enlarge a part of the image to check details of the live view image or a recorded image on the camera 100. When enlarging the image to check a dual side-by-side image portion, it is suitable to display the part of the right or the left image. If both the right and left images are included in the enlarged image, it is hard for the user to intuitively recognize which portion of the original image corresponding to the enlarged image.

However, when enlarging the image, uniquely setting the center position of the image enlargement target range to the center position of the entire image will enlarge the boundary portion including both the image from the right-eye optical system (right image) and the image from the left-eye optical system (left image). In this case, the left end portion of the image from the right-eye optical system is arranged on the right-hand side of the enlarged image, and the right end portion of the image from the left-eye optical system is arranged on the left-hand side of the enlarged image. This makes it hard for the user to check the enlarged image.

The present exemplary embodiment will be described below centering on processing of the camera 100 with reference to the flowchart in FIGS. 4A and 4B. The processing includes live view enlargement processing suitable for image capturing with a dual-lens unit such as the lens unit 300.

Figure 4A:
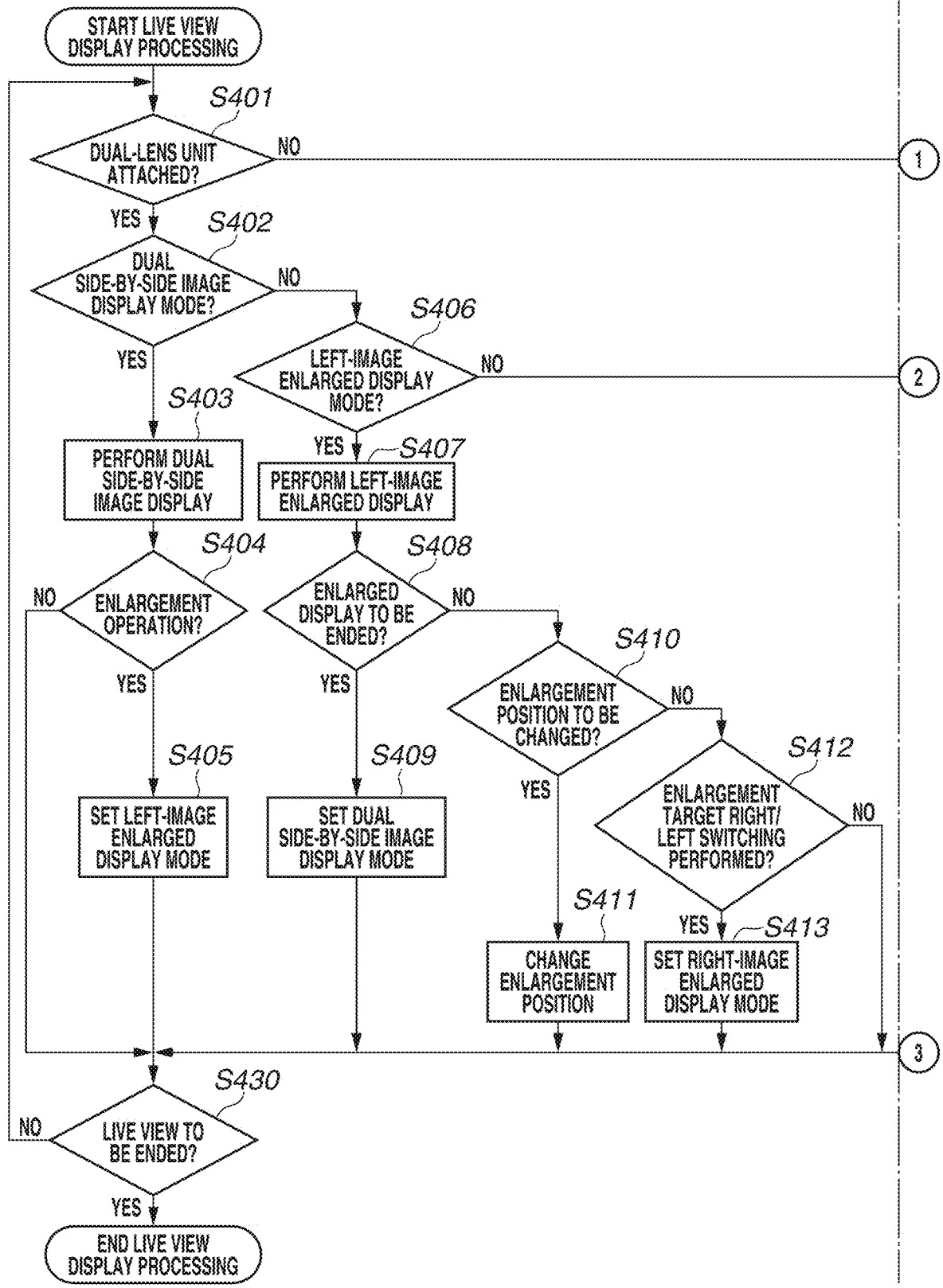
FIGS. 4A and 4B are a flowchart illustrating live view display processing by the camera.
Figure 4B:
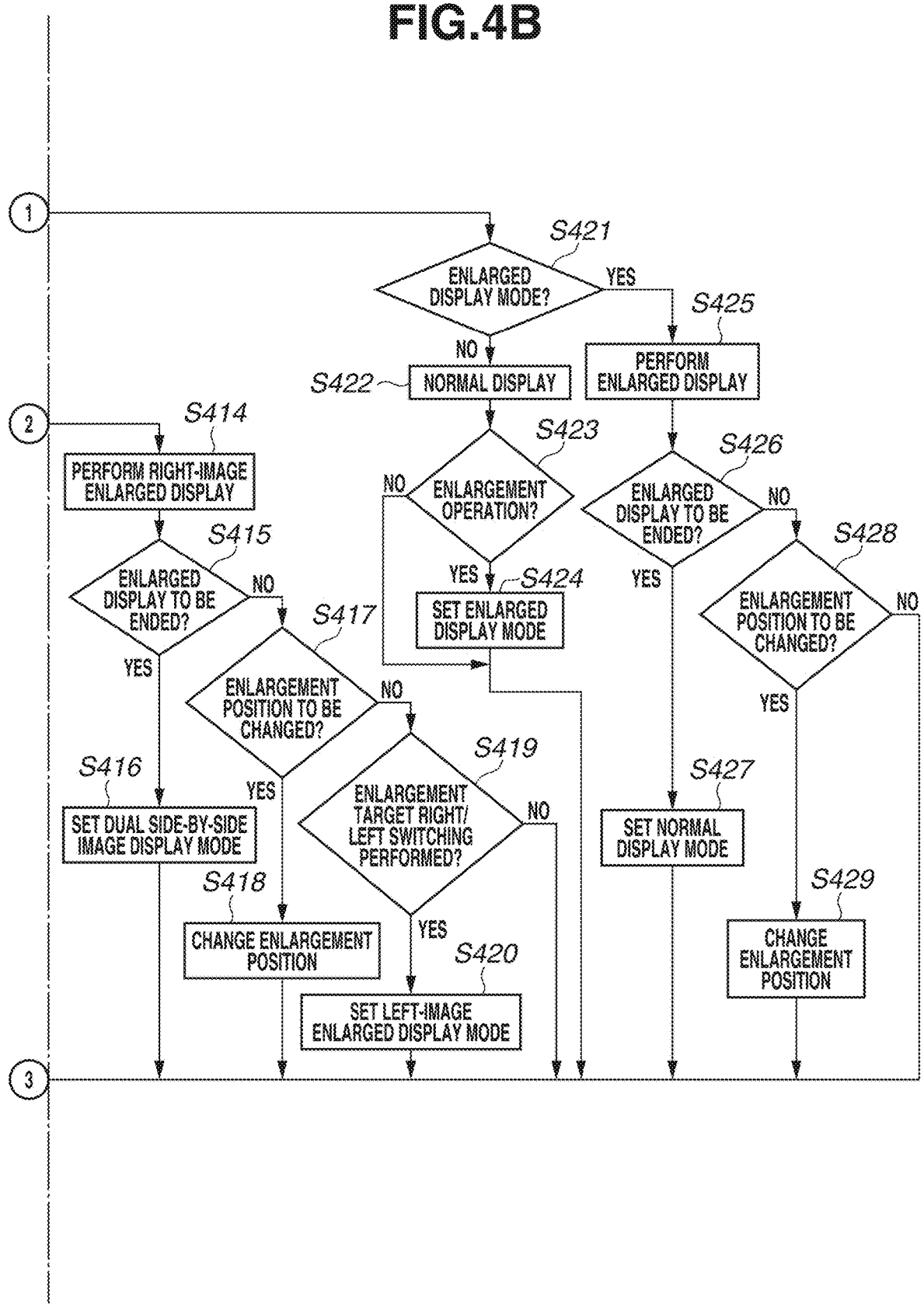

FIGS. 4A and 4B are a flowchart illustrating an example of processing of the camera 100. The processing in the flowchart in FIGS. 4A and 4B are carried out when the system control unit 50 loads programs recorded in the nonvolatile memory 219 into the system memory 218 and then runs the programs. The flowchart in FIGS. 4A and 4B is started when the camera 100 is set to the still image capturing mode or the moving image capturing mode.

In step S401, the system control unit 50 acquires information about the type of the attached lens unit and then determines whether the lens unit is a dual-lens unit. In this case, the system control unit 50 determines whether the attached lens unit is a VR180 lens unit. The system control unit 50 communicates with the attached lens unit via the communication terminal 124 to acquire information about the type of the lens unit from the lens unit. If the attached lens unit is a dual-lens unit (VR180 lens unit) (YES in step S401), the processing proceeds to step S402. On the other hand, if no lens unit is attached or the attached lens unit is a regular lens unit such as single-lens unit (NO in step S401), the processing proceeds to step S421. More specifically, if the lens unit attached to the camera 100 is the lens unit 200 as a conventional single-lens unit, the processing proceeds to step S421. On the other hand, if the lens unit attached to the camera 100 is the lens unit 300 as a dual-lens unit, the processing proceeds to step S402.

In step S402, the system control unit 50 determines whether the display mode setting at the time of the live view display is the dual side-by-side image display mode. Either the dual side-by-side image display mode, the left-image enlarged display mode, or the right-image enlarged display mode can be preset as the display mode at the time of the live view display of the dual side-by-side image. The display mode can be set by the user operating the menu screen. Information about the set display mode is prestored in the nonvolatile memory 219. In step S402, the system control unit 50 determines whether information about the dual side-by-side image display mode is stored in a control variable stored in the nonvolatile memory 219. If the dual side-by-side image display mode is set (YES in step S402), the processing proceeds to step S403. Otherwise (NO in step S402), the processing proceeds to step S406.

FIG. 5A illustrates an example of a live view image 500 at the time of the live view display in the dual side-by-side image display mode. The live view image 500 includes the image (right image) 501R captured through the right-eye optical system 301R and the image (left image) 501L captured through the left-eye optical system 301L. The images 501R and 501L each are circularly shaped, and the degree of distortion increases closer to the outer edge of the circle. The dual side-by-side image display mode makes it easier for the user to recognize that two different wide-field images are captured by the two optical systems and that, with the VR180 lens unit attached, the camera 100 is in the VR image capturing state. The dual side-by-side image display mode, on the other hand, separately displays the two images in one screen and is not suitable for the user to check the focus and subject expression in detail. For that reason, the dual side-by-side image display mode is used, for example, when the user does not check the focus and subject expression in detail.

FIG. 5B illustrates an example of a live view image 502 at the time of the live view display in the left-image enlarged display mode. In comparison with the live view image 500 at the time of the live view display in the dual side-by-side image display mode, the portion of the live image (left image) captured through the left-eye optical system is enlarged, making it easier for the user to check details of the image.

A display optical system guide 503 indicates which of the right-eye and the left-eye optical systems the captured live image is currently being displayed through. The guide 503 includes a region 504 for the dual side-by-side image corresponding to the left-eye optical system, and a region 505 for the dual side-by-side image corresponding to the right-eye optical system. The background on the side corresponding to the currently displayed optical system is shaded. In this example, the background of the region 504 for the currently displayed dual side-by-side image corresponding to the left-eye optical system is shaded. This enables the user to recognize which of the right-eye and the left-eye optical systems the currently displayed live image comes from. A frame 506 in the guide 503 indicates the enlargement target range of the dual side-by-side image. In this example, the circle on the region 504 indicating the left-eye optical system represents the image region of the live image from the left-eye optical system before the enlargement, and a rectangle is displayed in the region corresponding to the position of the currently displayed enlarged live image.

A button 507 is a graphical user interface (GUI) that accepts an operation for changing the enlargement target. When the user performs a touch-down on the touch panel 109, the button 507 is displayed in the display unit 108 as an operation button for performing processing to switch the enlargement target image between the left and the right images. If the user presses the enlargement target right/left switching button, the display mode can be changed from the left-image enlarged display mode to the right-image enlarged display mode. If the current display mode is the right-image enlarged display mode, the display mode can be changed to the left-image enlarged display mode. According to the present exemplary embodiment, in selecting the enlargement target image, the enlargement position is determined to be the position of the other image corresponding to the enlargement position of the image before the switching. For example, the enlargement position may be determined by measuring the distance from the current enlargement position to the subject, calculating the amount of parallax together with the positions of the right and the left optical systems, and then shifting the enlargement position by the amount of parallax.

FIG. 5C illustrates an example of a live view image 508 at the time of the live view display in the right-image enlarged display mode. The right-image enlarged display mode is similar to the left-image enlarged display mode except that the enlargement target image is the image (right image) 501R, and redundant descriptions thereof will be omitted.

In step S403, the system control unit 50 subjects the live image captured by the imaging unit 211 through the VR180 lens unit to the dual side-by-side image display, i.e., the system control unit 50 displays the live image in the display unit 108 in the dual side-by-side image display mode. In the dual side-by-side image display mode, the live image captured by the imaging unit 211 is displayed in the live view in the display unit 108 so that the live image captured through the right-eye optical system of the VR180 lens unit and the live image captured through the left-eye optical system thereof are arranged side by side. As illustrated in FIG. 5A, the image 500 in which the right-side image 501R and the left-side image 501L are arranged side by side is displayed in the display unit 108.

In step S404, the system control unit 50 determines whether the user performs an operation for enlarging the live view image. More specifically, the system control unit 50 determines whether an enlargement instruction input through the enlargement operation is received. For example, the enlargement instruction is input through the depression of the enlargement button 113 or a pinch-out operation on the touch panel 109. If the enlargement instruction is received, i.e., if the system control unit 50 determines that the user has performed an operation for enlarging the live view image (YES in step S404), the processing proceeds to step S405. If neither operation is detected (NO in step S404), the processing proceeds to step S430.

In step S405, the system control unit 50 sets the display mode at the time of the live view display to the left-image enlarged display mode. More specifically, the system control unit 50 stores information about the left-image enlarged display mode in a control variable stored in the nonvolatile memory 219. Then, the processing proceeds to step S430.

In step S430, the system control unit 50 determines whether to end the live view image display. The system control unit 50 determines to end the live view image display, for example, if an instruction for entering the menu mode is input. The menu mode is a mode in which the user displays the menu screen from either the still image or the moving image mode and then makes settings. When the user operates the power button to turn power OFF, the system control unit 50 determines to end the live view image display. If the system control unit 50 determines to end the live view image display (YES in step S430), the processing exits the flowchart of the live view display processing. Otherwise (NO in step S430), the processing returns to step S401.

In step S406, the system control unit 50 determines whether the current display mode setting is the left-image enlarged display mode. More specifically, the system control unit 50 determines whether information about the left-image enlarged display mode is stored in a control variable stored in the nonvolatile memory 219. If the left-image enlarged display mode is set (YES in step S406), the processing proceeds to step S407. Otherwise (NO in step S406), the processing proceeds to step S414.

In step S407, the system control unit 50 enlarges the left-side image portion of the dual side-by-side image captured by the imaging unit 211 via the lens unit 300. The left-image enlarged display mode is a mode for enlarging the image (left-side image) captured through the left-eye optical system of the lens unit 300 out of the live image captured by the imaging unit 211, and displaying the enlarged image as the live view in the display unit 108. The system control unit 50 reads information about the enlargement position from a control variable stored in the system memory 218, and enlarges the region corresponding to the enlargement position of the image captured via the left-eye optical system. In this case, if no information is stored in the control variable or no setting is made at the enlargement position in advance, the system control unit 50 enlarges the central portion of the image captured via the left-eye optical system and then displays the enlarged image. FIG. 5B is a schematic view illustrating the live view image displayed in the left-image enlarged display mode. As described above, a part of the left-side image 501L in FIG. 5A is enlarged and displayed as the live view image 502. The guide 503 and the button 507 are also displayed. Then, when the user performs the enlargement operation in a state where the dual side-by-side image is displayed, the user is able to immediately check details of the portion of either one (left-side image) of the right-side and left-side images.

In step S408, the system control unit 50 determines whether to end the enlarged display. More specifically, the system control unit 50 determines whether an instruction (enlargement end instruction) input in response to the operation for ending the enlarged display is received. If the instruction is received, the system control unit 50 determines to end the enlarged display. For example, the system control unit 50 determines whether the user has performed an operation (enlargement end operation) to issue an instruction for ending the enlarged live view image display. More specifically, the enlargement end operation is a depression of the enlargement button 113 by the user. A pinch-in operation (reduction operation) on the touch panel 109 may also be detected as an enlargement end operation. If an enlargement end operation is detected, i.e., if the system control unit 50 determines to end the enlarged display (YES in step S408), the processing proceeds to step S409. On the other hand, if no enlargement end operation is performed, i.e., if the system control unit 50 determines not to end the enlarged display (NO in step S408), the processing proceeds to step S410. If no operation has been performed within a predetermined time period since the enlarged display was started (time-out), the system control unit 50 may determine to end the enlarged display.

In step S409, the system control unit 50 sets the display mode at the time of the live view display to the dual side-by-side image display mode. More specifically, the system control unit 50 stores information about the dual side-by-side image display mode in a control variable stored in the nonvolatile memory 219. Then, the processing proceeds to step S430.

In step S410, the system control unit 50 determines whether an instruction for changing the enlargement position (enlargement range) subjected to the enlargement processing in the enlarged display is input. More specifically, the system control unit 50 determines whether the user has performed an operation for changing the enlargement position. Examples of operations for changing the enlargement position include a touch-move operation on the touch panel 109 and cursor key operations. If an operation for changing the enlargement position is detected, i.e., if the system control unit 50 determines that an instruction for changing the enlargement position is input (YES in step S410), the processing proceeds to step S411. On the other hand, if the system control unit 50 determines that the instruction is not input (NO in step S410), the processing proceeds to step S412. In an operation for changing the enlargement position, an enlargement range can be set in the left-side image.

In step S411, the system control unit 50 performs processing for changing the enlargement position. More specifically, the system control unit 50 changes the enlargement position of the live image captured through the left-eye optical system based on information about the direction and distance of the enlargement position change operation detected in step S410. The system control unit 50 also stores information about the enlargement position in a control variable stored in the system memory 218. Then, the processing proceeds to step S430.

In step S412, the system control unit 50 determines whether the user has performed an enlargement target right/left switching operation. More specifically, the system control unit 50 detects whether an operation on the button 507 displayed in the display unit 108 is performed. If the operation is detected (YES in step S412), the processing proceeds to step S413. Otherwise (NO in step S412), the processing proceeds to step S430.

In step S413, the system control unit 50 sets the display mode at the time of the live view display to the right-image enlarged display mode. More specifically, the system control unit 50 stores information about the right-image enlarged display mode in a control variable stored in the nonvolatile memory 219. Then, the processing proceeds to step S430.

The above-described processing in steps S407 to S413 is processing in the left-image enlarged display mode. In the left-image enlarged display mode, the left-side image alone of the dual side-by-side image is subjected to the enlargement processing and enlarged. This enables the user to avoid recognizing the displayed enlarged image as the right-side image portion or the left-side image portion in a confused way.

Operations in the right-image enlarged display mode will be described.

In step S414, the system control unit 50 enlarges the right-side image portion of the dual side-by-side image captured by the imaging unit 211 through the lens unit 300. The right-image enlarged display mode is a mode for enlarging the image (right-side image) captured through the right-eye optical system of the lens unit 300 out of the live image captured by the imaging unit 211, and displaying the enlarged image as the live view in the display unit 108. The system control unit 50 reads information about the enlargement position from a control variable stored in the system memory 218, and enlarges the region corresponding to the enlargement position of the image captured through the right-eye optical system. In this case, if no information is stored in the control variable or no setting is made at the enlargement position in advance, the system control unit 50 subjects the central portion of the image captured through the right-eye optical system to the enlargement processing and then displays the enlarged image. FIG. 5C is a schematic view illustrating the live view image displayed in the right-image enlarged display mode. As described above, a part of the right-side image 501R in FIG. 5A is enlarged and displayed as the live view image 508. The guide 503 and the button 507 are displayed. Then, the processing proceeds to step S415.

In step S415, the system control unit 50 determines whether to end the enlarged display. More specifically, the system control unit 50 determines whether an instruction (enlargement end instruction) input in response to the operation fir ending the enlarged display is received. If the instruction is received, the system control unit 50 determines to end the enlarged display. For example, the system control unit 50 determines whether the user has performed an operation (enlargement end operation) to issue an instruction for ending the enlarged live view image display. More specifically, the enlargement end operation is a depression of the enlargement button 113 by the user. A pinch-in operation on the touch panel 109 may also be detected as an enlargement end operation. If an enlargement end operation is detected, i.e., if the system control unit 50 determines to end the enlarged display (YES in step S415), the processing proceeds to step S416. On the other hand, if no enlargement end operation is performed, if the system control unit 50 determines not to end the enlarged display (NO in step S415), the processing proceeds to step S417. If no operation has been performed within a predetermined time period since the enlarged display was started (time-out), the system control unit 50 may determine to end the enlarged display.

In step S416, the system control unit 50 sets the display mode at the time of the live view display to the dual side-by-side image display mode. More specifically, the system control unit 50 stores information about the dual side-by-side image display mode in a control variable stored in the nonvolatile memory 219. Then, the processing proceeds to step S430.

In step S417, the system control unit 50 determines whether an instruction for changing the enlargement position (enlargement range) subjected to the enlargement processing in the enlarged display is input. More specifically, the system control unit 50 determines whether the user has performed an operation for changing the enlargement position. Examples of operations for changing the enlargement position include a touch-move operation on the touch panel 109 and cursor key operations. If an operation for changing the enlargement position is detected, i.e., if the system control unit 50 determines that an instruction for changing the enlargement position is input (YES in step S417), the processing proceeds to step S418. On the other hand, if the system control unit 50 determines that the instruction is not input (NO in step S417), the processing proceeds to step S419. In an operation for changing the enlargement position, an enlargement range can be set in the left-side image.

In step S418, the system control unit 50 performs processing for changing the enlargement position. More specifically, the system control unit 50 changes the enlargement position of the live image captured through the right-eye optical system based on information about the direction and distance of the enlargement position change operation detected in step S417. The system control unit 50 also stores information about the enlargement position in a control variable stored in the system memory 218. Then, the processing proceeds to step S430.

In step S419, the system control unit 50 determines whether the user has performed an enlargement target right/left switching operation. More specifically, the system control unit 50 detects whether an operation on the button 507 displayed in the display unit 108 is performed. If the operation is detected (YES in step S419), the processing proceeds to step S420. Otherwise (NO in step S419), the processing proceeds to step S430.

In step S420, the system control unit 50 sets the display mode at the time of the live view display to the left-image enlarged display mode. More specifically, the system control unit 50 stores information about the left-image enlarged display mode in a control variable stored in the nonvolatile memory 219. Then, the processing proceeds to step S430.

The above-described processing in steps S414 to S420 is processing in the right-image enlarged display mode. In the right-image enlarged display mode, the right-side image alone of the dual side-by-side image is subjected to the enlargement processing and enlarged. This enables the user to avoid recognizing the displayed enlarged image as the right-side image portion or the left-side image portion in a confused way.

As described above, with the lens unit 300 that acquires a dual side-by-side image attached to the camera 100 and an image based on the dual side-by-side image displayed, the system control unit 50 of the camera 100 enlarges either the right-side or left-side images according to the enlargement instruction. With the enlarged display made, the above-described control enables preventing the right-side and left-side image portions from being mixed in the displayed image, thus improving user's visibility.

The system control unit 50 of the camera 100 according to the present exemplary embodiment changes the setting of the enlargement target range according to the type of the lens unit attached to the camera 100 in response to an issuance of an enlargement processing instruction. Operations with the lens unit 200 as a conventional single-lens lens unit attached to the camera 100 will be described.

In step S421, the system control unit 50 determines whether the display mode setting at the time of the live view display is the enlarged display mode. More specifically, the system control unit 50 determines whether information about the enlarged display mode is stored in a control variable stored in the nonvolatile memory 219. If the enlarged display mode is set (YES in step S421), the processing proceeds to step S425. Otherwise (NO in step S421) the processing proceeds to step S422.

Figure 6A:
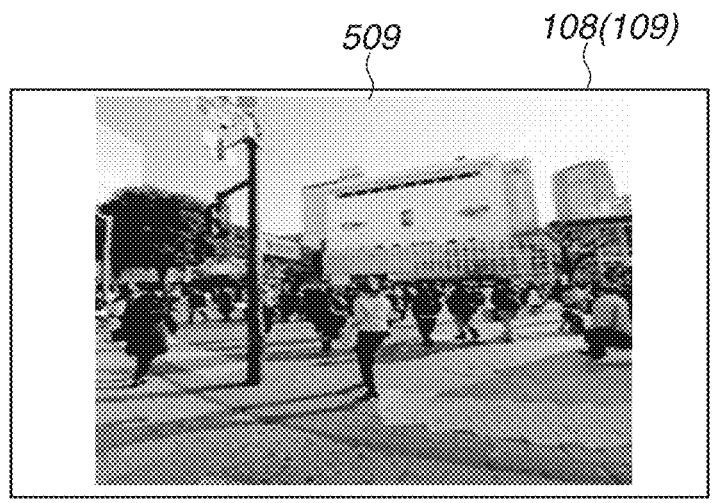
FIGS. 6A and 6B are schematic views illustrating live view images of monocular images.

In step S422, the system control unit 50 displays the live image captured by the imaging unit 211 through the lens unit 200, in the live view in the display unit 108 in the normal display mode. The normal display mode is a mode for displaying the live image captured by the imaging unit 211 through the optical system of the lens unit 200 without enlargement, in the live view in the display unit 108. FIG. 6A illustrates an example of a live view image 509 at the time of the live view display in the normal display mode. The processing proceeds to step S423.

In step S423, the system control unit 50 determines whether the user has performed an operation for enlarging the live view image. More specifically, the system control unit 50 determines whether an enlargement instruction input through the enlargement operation is received. For example, the enlargement instruction is input through a depression of the enlargement button 113 or a pinch-out operation on the touch panel 109. If the enlargement instruction is received, i.e., if the system control unit 50 determines that the user has performed an operation for enlarging the live view image (YES in step S423), the processing proceeds to step S424. If neither operation is detected (NO in step S423), the processing proceeds to step S430.

In step S424, the system control unit 50 sets the display mode at the time of the live view display to the enlarged display mode. More specifically, the system control unit 50 stores information about the enlarged display mode in a control variable stored in the nonvolatile memory 219. Then, the processing proceeds to step S430.

Figure 6B:
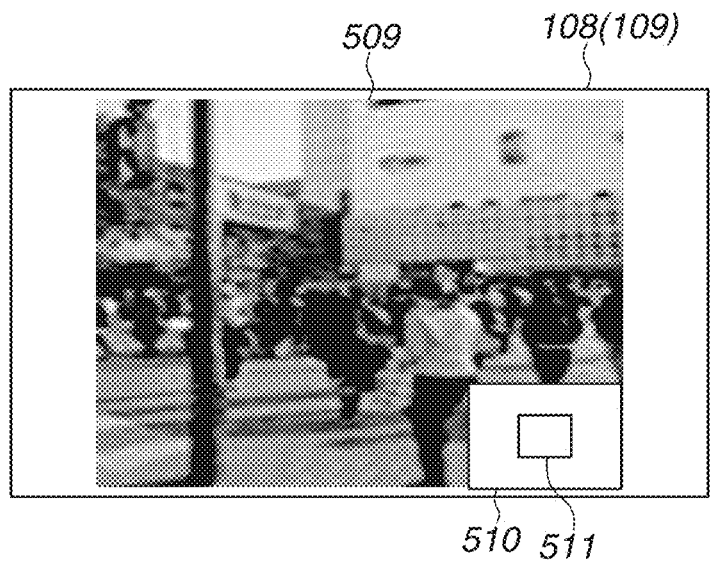

In step S425, the system control unit 50 displays the live image captured by the imaging unit 211 through the lens unit 200, in the live view in the display unit 108 in the enlarged display mode. The enlarged display mode is a mode for enlarging the live image captured by the imaging unit 211 via the optical system of the lens unit 200 and then displaying the enlarged image in the live view in the display unit 108. The system control unit 50 reads information about the enlargement position from a control variable stored in the system memory 218, and enlarges the position corresponding to the live image captured via a normal imaging lens unit. If no information is stored in a control variable, the center position of the image is predetermined as the initial position of the enlargement position. FIG. 6B illustrates an example of a live view image 509 at the time of the live view display in the enlarged display mode. Enlarged position guides 510 and 511 indicate which position of the live image before the enlargement is enlarged as the currently displayed live image. The enlarged position guide 510 corresponds to the entire live image before the enlargement, and the enlarged position guide 511 represents the enlarged region currently being displayed. Then, the processing proceeds to step S426.

In step S426, the system control unit 50 determines whether to end the enlarged display. More specifically, the system control unit 50 determines whether an instruction (enlargement end instruction) input in response to the operation for ending the enlarged display is received. If the instruction is received, the system control unit 50 determines to end the enlarged display. For example, the system control unit 50 determines whether the user has performed an operation (enlargement end operation) to issue an instruction for ending the enlarged live view image display. More specifically, the enlargement end operation is a depression of the enlargement button 113 by the user. A pinch-in operation on the touch panel 109 may also be detected as an enlargement end operation. If an enlargement end operation is detected, i.e., if the system control unit 50 determines to end the enlarged display (YES in step S426), the processing proceeds to step S427. On the other hand, if no enlargement end operation is performed, if the system control unit 50 determines not to end the enlarged display (NO in step S426), the processing proceeds to step S428. If no operation has been performed within a predetermined time period since the enlarged display was started (time-out), the system control unit 50 may determine to end the enlarged display.

In step S427, the system control unit 50 sets the display mode at the time of the live view display to the normal display mode. More specifically, the system control unit 50 stores information about the normal display mode in a control variable stored in the nonvolatile memory 219. Then, the processing proceeds to step S430.

In step S428, the system control unit 50 determines whether an instruction for changing the enlargement position (enlargement range) subjected to the enlargement processing in the enlarged display is input. More specifically, the system control unit 50 determines whether the user has performed an operation for changing the enlargement position. Examples of operations for changing the enlargement position include a touch-move operation on the touch panel 109 and cursor key operations. If an operation for changing the enlargement position is detected, i.e., if the system control unit 50 determines that an instruction for changing the enlargement position is input (YES in step S428), the processing proceeds to step S429. On the other hand, if the system control unit 50 determines that the instruction is not input (NO in step S428), the processing proceeds to step S430.

In step S429, the system control unit 50 changes the enlargement position of the live view image. More specifically, the system control unit 50 changes the enlargement position of the live image captured through the optical system of the lens unit 200 based on information about the direction and distance of the enlargement position change operation detected in step S428. The system control unit 50 also stores information about the enlargement position in a control variable stored in the system memory 218. Then, the processing proceeds to step S430.

As described above, with the lens unit 200 as a conventional single-lens unit attached to the camera 100, the system control unit 50 of the camera 100 according to the present exemplary embodiment enlarges the central portion of the image according to an enlargement instruction. The lens unit 300 as a dual-lens unit capable of acquiring a dual side-by-side image is attachable to the camera 100. The dual side-by-side image includes the right-side and left-side images with a parallax arranged side by side. With a dual-lens unit attached to the camera 100, the system control unit 50 of the camera 100 enlarges the central portion of one of the left and the right-side images according to an enlargement instruction. More specifically, the system control unit 50 changes the position of the enlargement range subjected to the enlargement processing according to the type of the lens unit attached to the camera 100. This eliminates the user's need to change the setting of the enlargement target position according to the type of the lens unit each time, easily providing an enlarged display with a suitably enlarged range.

As described above, in image capturing using a dual-lens unit according to the present exemplary embodiment, one of the right-side and left-side images is enlarged at the time of the enlarged display even while the images from the right and the left optical systems are displayed side by side. This enables reducing the user's difficulty in recognizing an enlarged boundary portion between the right-side and left-side images. In the present exemplary embodiment, an electronic apparatus is provided that enlarges one of the right-side and left-side images to make it easier for the user to check details of the image.

Although the present exemplary embodiment has been described above on the premise that the live view image displayed through a dual-lens unit is subjected to enlarged display, the present exemplary embodiment is also applicable to a case where an image captured through a dual-lens unit and reproduced from a Secure Digital (SD) card is subjected to enlarged display.

The present exemplary embodiment has been described above centering on a case of moving an enlargement position within the left-side image region during enlarged display of the left-side image or within the right-side image region during enlarged display of the right-side image. However, upon reception of an instruction for moving an enlargement position to exceed the end of the right-side or the left-side image, i.e., an instruction for changing an enlargement position to the outside of either image, the enlargement position may be moved to an end region of the other image. For example, upon reception of an instruction for further moving the enlargement position to the right while the right end region of the left-side image is displayed in the left-image enlarged display mode, the right-image enlarged display mode is entered and then the enlargement position is moved to the left end region of the right-side image. In this case, a movement instruction may be issued in such a way that the enlargement position is gradually moved starting in a state where the end of the image is not enlarged, and then the enlargement position eventually exceeds the end of the image. In this case, the enlargement position may be moved to the position where the end of the image is to be enlarged, without subjecting the other image to the enlargement position movement. Then, upon issuance of an instruction for moving the enlargement position to exceed the end of the image again, the enlargement position may be moved to the end region of the other image.

Upon issuance of an instruction for moving the enlargement position to exceed the end of one enlarged image, the other image may be enlarged and arranged next to the currently enlarged image, and an image including the enlarged right end region of the left-side image and the enlarged left end region of the right-side image may be displayed.

Although, in this example, an enlarged version alone of the image captured through one optical system is displayed in the live view, the live image captured through the other optical system may be displayed without the enlargement, together with the enlarged image. An example display in this case is illustrated in FIG. 5D. FIG. 5D illustrates an enlarged version of a live image 512 captured through the left-eye optical system, and a live image 513 captured through the right-eye optical system. In this case, as the user wants to check details of the enlarged version of the live image captured through the left-eye optical system, the live image 513 captured through the right-eye optical system is partly hidden. According to the present disclosure, as long as a live image captured through the left-eye optical system or a live image captured through the right-eye optical system is subjected to enlargement, any other image can be displayed at the same time.

While the present disclosure has specifically been described based on the exemplary embodiments, the present disclosure is not limited to these specific exemplary embodiments. Diverse embodiments not departing from the spirit and scope of the present disclosure are also included in the present disclosure. A part of the above-described exemplary embodiments may be suitably combined.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

The present disclosure makes it possible to implement image display suitable for checking details of an image including a right-eye image and a left-eye image arranged side by side.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2021-074490, filed Apr. 26, 2021, which is hereby incorporated by reference herein in its entirety.

What is claimed is:

1. An electronic apparatus comprising:
    a connection unit configured to connect with a lens unit;
    an imaging unit configured to generate image data based on an optical image input through the lens unit;
    a processor; and
    a memory storing a program which, when executed by the processor, causes the electronic apparatus to:
    perform control to display an image in a display unit based on the image data;
    receive an enlargement instruction for enlarging a part of the image displayed in the display unit; and
    perform control, upon reception of the enlargement instruction, to display in the display unit an enlarged image of a part of the image data generated by the imaging unit which differs depending on a type of the lens unit connected to the connection unit,
    wherein the enlarged image of a center part of either one of a first image region and a second image region of the image data generated by the imaging unit is displayed in the display unit, in a case where a lens unit of a first type is connected to the connection unit, and
    wherein the enlarged image of a center part of the image data generated by the imaging unit is displayed in the display unit, in a case where a lens unit of a second type is connected to the connection unit,
    wherein the lens unit of the first type includes a first optical system that inputs a first optical image corresponding to the first image region, and a second optical system that inputs a second optical image corresponding to the second image region, with a predetermined parallax to the first optical image, and
    wherein the lens unit of the second type includes a single optical system.

2. A method of controlling an electronic apparatus including a connection unit configured to connect with a lens unit and an imaging unit configured to generate image data based on an optical image input through the lens unit, the method comprising:
    performing control to display an image in a display unit based on the image data; and
    receiving an enlargement instruction for enlarging a part of the image displayed in the display unit; and
    displaying in the display unit an enlarged image of a part of the image data generated by the imaging unit which differs depending on a type of the lens unit connected to the connection unit,
    wherein the enlarged image of a center part of the image data generated by the imaging unit is displayed in the display unit, in a case where a lens unit of a second type is connected to the connection unit,
    wherein the enlarged image of a center part of the image data generated by the imaging unit is displayed in the display unit, in a case where a lens unit of a second type is connected to the connection unit, wherein the lens unit of the first type includes a first optical system that inputs a first optical image corresponding to the first image region, and a second optical system that inputs a second optical image corresponding to the second image region, with a predetermined parallax to the first optical image, and wherein the lens unit of the second type includes a single optical system.

3. A non-transitory computer-readable storage medium storing a program that, when executed by a processor, causes the processor to perform a method of controlling an electronic apparatus, the method comprising:

displaying an image in a display unit based on image data generated based on an optical image input through a lens unit connectable to a connection unit;

receiving an enlargement instruction for enlarging a part of the image displayed in the display unit; and displaying in the display unit an enlarged image of a part of the image data generated by an imaging unit which differs depending on a type of the lens unit connected to the connection unit, wherein the enlarged image of a center part of the image data generated by the imaging unit is displayed in the display unit, in a case where a lens unit of a second type is connected to the connection unit, wherein the enlarged image of a center part of the image data generated by the imaging unit is displayed in the display unit, in a case where a lens unit of a second type is connected to the connection unit, wherein the lens unit of the first type includes a first optical system that inputs a first optical image corresponding to the first image region, and a second optical system that inputs a second optical image corresponding to the second image region, with a predetermined parallax to the first optical image, and wherein the lens unit of the second type includes a single optical system.

4. The electronic apparatus according to claim 1, wherein the program further causes the electronic apparatus to be capable of performing control to store information about a position of a part of the image data in a memory, and wherein the enlarged image of the part of the image data based on the information stored in the memory is displayed in the display unit regardless of the type of the lens unit which is connected to the connection unit, if the information is stored in the memory, upon reception of the enlargement instruction.

5. The electronic apparatus according to claim 1, wherein the program further causes the electronic apparatus to perform control to change the part of the image data to be the enlarged image, and wherein the part of the image data is capable of changing only inside either the first image region or the second image region, in a case where the lens unit of the first type is connected to the connection unit.

6. The electronic apparatus according to claim 5, wherein the program further causes the electronic apparatus to perform control to, upon reception of an instruction for changing outside of either the first image region or the second image region, change the part of the image data to be enlarged image to end part of the other image region.

7. The electronic apparatus according to claim 5, wherein the program further causes the electronic apparatus to perform control to store information about a position where the part of the image data to be enlarged changed in a memory.

8. The electronic apparatus according to claim 1, wherein the program further causes the electronic apparatus to perform control to switch the part of the image data to be enlarged between the first image region and the second image region, in a case where a lens unit of a first type is connected to the connection unit.

9. The electronic apparatus according to claim 1, wherein the program further causes the electronic apparatus to perform control to display a guide indicating which of the enlarged images of the first image region and the second image region of the image data generated by the imaging unit is currently displayed in the display unit, in a case where a lens unit of a first type is connected to the connection unit.

10. The electronic apparatus according to claim 1, wherein the first image region and the second image region include circular optical images.

11. The electronic apparatus according to claim 1, wherein the image data is generated by forming the first optical image corresponding to the first image region and the second optical image corresponding to the second image region side by side on the imaging unit.

12. The electronic apparatus according to claim 1, wherein the image data is a live view image.

* * * * *